United States Patent
Sundara et al.

(10) Patent No.: US 9,944,774 B2
(45) Date of Patent: Apr. 17, 2018

(54) GRAPHENE FUNCTIONALIZED CARBON NANOTUBE POLYMER COMPOSITES AND METHODS FOR THEIR PREPARATION AND USE

(71) Applicant: INDIAN INSTITUTE OF TECHNOLOGY MADRAS, Chennai (IN)

(72) Inventors: Ramaprabhu Sundara, Chennai (IN); Eswaraiah Varrla, Kurnool (IN); Jyothirmayee Aravind Sasidharannair Sasikaladevi, Trivandrum (IN); Krishnan Balasubramanian, Chennai (IN)

(73) Assignee: INDIAN INSTITUTE OF TECHNOLOGY MADRAS, Chennai (IN)

( * ) Notice: Subject to any disclaimer, the term of this patent is extended or adjusted under 35 U.S.C. 154(b) by 3 days.

(21) Appl. No.: 14/410,109

(22) PCT Filed: Jan. 8, 2013

(86) PCT No.: PCT/IB2013/050144
§ 371 (c)(1),
(2) Date: Dec. 22, 2014

(87) PCT Pub. No.: WO2013/190398
PCT Pub. Date: Dec. 27, 2013

(65) Prior Publication Data
US 2015/0337090 A1    Nov. 26, 2015

(30) Foreign Application Priority Data
Jun. 21, 2012   (IN) ........................... 2468/CHE/2012

(51) Int. Cl.
*C08K 9/02* (2006.01)
*G01L 1/22* (2006.01)
*C08J 5/00* (2006.01)

(52) U.S. Cl.
CPC ................. *C08K 9/02* (2013.01); *G01L 1/22* (2013.01); *C08J 5/005* (2013.01); *C08J 2327/22* (2013.01); *C08K 2201/011* (2013.01)

(58) Field of Classification Search
CPC ..... B82Y 30/00; B82Y 40/00; C01B 2204/02; C01B 2204/30; C01B 31/0476;
(Continued)

(56) References Cited

U.S. PATENT DOCUMENTS 7,785,557 B2    8/2010   Gruner et al.
8,182,782 B1    5/2012   Moraysky et al.
(Continued)

OTHER PUBLICATIONS

International Search Report and Written Opinion of the International Searching Authority, International application No. PCT/IB2013/050144, dated Jun. 19, 2013.
(Continued)

*Primary Examiner* — Harshad R Patel
*Assistant Examiner* — Brandi Hopkins
(74) *Attorney, Agent, or Firm* — Turk IP Law, LLC

(57) ABSTRACT

Methods of forming graphene functionalized carbon nanotube polymer composites are provided. The methods can include functionalizing a plurality of carbon nanotubes using conducting functional molecules to form a composite nanofiller and embedding the composite nanofiller within a polymer material to form the graphene functionalized carbon nanotube polymer composite.

9 Claims, 5 Drawing Sheets

(58) Field of Classification Search
CPC ............ C01B 31/0484; C01B 2204/28; C01B 31/043; C01B 31/0423; C01B 2204/04; C09D 5/24; C08K 3/04; C08K 2201/008; C08K 9/02; C08K 2201/011; C01P 2004/24; C01P 2006/10; C01P 2004/54; C01P 2006/62; Y10S 95/903; Y10S 977/734; Y10S 977/832; Y10S 977/742; Y10S 977/737; Y10S 977/834; Y10S 977/753; C08J 2300/00; C08J 5/005; C08J 2327/22; H01B 1/24; G01L 1/22
USPC ........... 73/774, 760, 763; 427/256; 252/500; 423/447.1, 460
See application file for complete search history.

(56) References Cited

U.S. PATENT DOCUMENTS

| | | | |
|---|---|---|---|
| 9,095,639 B2* | 8/2015 | Ajayan | A61L 24/0078 |
| 2010/0096595 A1 | 4/2010 | Prud'Homme et al. | |
| 2010/0143798 A1* | 6/2010 | Zhamu | H01M 4/133 429/212 |
| 2010/0255303 A1* | 10/2010 | Wardle | B82Y 10/00 428/378 |
| 2011/0017921 A1* | 1/2011 | Jiang | H01J 37/20 250/440.11 |
| 2011/0052813 A1 | 3/2011 | Ho et al. | |

OTHER PUBLICATIONS

Songfeng Pei et al., "The Reduction of Graphene Oxide", Carbon, Article Accepted on Nov. 8, 2011, pp. 3210-3228, doi10.1016/j.carbon.2011.11.010.
"Strain Gauge", Wikipedia, Accessed at <URL: http://web.archive.org/web/20120406155624/http://en.wikipedia.org/wiki/Strain_gauge> on Nov. 27, 2014, Last Modified on Mar. 16, 2012.
A. A. Artyukh et al., "Mechanical and Electronic Properties of Carbon Nanotube-Graphene Compounds", Physica status solidi (b), Dec. 2010, pp. 2927-2930, vol. 247, No. 11-12.
L. A. Chernozatonskii et al., "Graphene-Nanotube Structures: Constitution and Formation Energy", JETP Letters, 2009, pp. 352-356, vol. 89, No. 7.
Prasad Dharap et al., "Nanotube Film Based on Single-Wall Carbon Nanotubes for Strain Sensing", Nanotechnology, 2004, pp. 379-382, vol. 15, Institute of Physics Publishing.
Varrla Eswaraiah et al., "Top Down Method for Synthesis of Highly Conducting Graphene by Exfoliation of Graphite Oxide Using Focused Solar Radiation", Journal of Materials Chemistry, 2011, pp. 6800-6803, vol. 21.
Varrla Eswaraiah et al., "Functionalized Graphene Reinforced Thermoplastic Nanocomposites as Strain Sensors in Structural Health Monitoring", Journal of Materials Chemistry, Jul. 2011, pp. 12626-12628, vol. 21, Issue 34.
Zhuangjun Fan et al., "A Three-Dimensional Carbon Nanotube/Graphene Sandwich and Its Application as Electrode in Supercapacitors", Advanced Materials, Sep. 1, 2010, pp. 3723-3728, vol. 22, No. 33.
Ning Hu et al., "Investigation on Sensitivity of a Polymer/Carbon Nanotube Composite Strain Sensor", Carbon, 2010, pp. 680-687, vol. 48, No. 3.
Ning Hu et al., "Tunneling Effect in a Polymer/Carbon Nanotube Nanocomposite Strain Sensor", ActaMaterialia, 2008, pp. 2929-2936, vol. 56, No. 13.
Mingyua Huang et al., "Electronic-Mechanical Coupling in Graphene from in situ Nanoindentation Experiments and Multiscale Atomistic Simulations", Nano Letters, 2011, pp. 1241-1246, vol. 11, No. 3.
Young-Ju Kim et al., "Preparation of Piezoresistive Nano Smart Hybrid Material based on Graphene", Current Applied Physics, 2011, pp. S350-S352, vol. 11, No. 1.
Youngbin Lee et al., "Wafer-Scale Synthesis and Transfer of Graphene Films", Nano Letters, Feb. 10, 2010, pp. 490-493, vol. 10, No. 2.
Chunyan Li et al., "Graphene Nano-"patches" on a Carbon Nanotube Network for Highly Transparent/Conductive Thin Film Applications", J Phys. Chem. C, 2010, pp. 14008-14012, vol. 114, No. 33.
Yunfang Li et al., "Helical Wrapping and Insertion of Graphene Nanoribbon to Single-Walled Carbon Nanotube", The Journal of Physical Chemistry C, 2011, pp. 18459-18467, vol. 115.
Zhiling Li et al., "Carbon Nanotube Film Sensors", Advanced Materials, Apr. 5, 2004, pp. 640-643, vol. 16, No. 7.
M. Lucci et al., "Carbon Nanotubes Films for Sensing Applications: From Piezoresistive Sensor to Gas Sensing", Nonequilibrium Carrier Dynamics in Semiconductors, Springer Proceedings in Physics, 2006, pp. 191-194, vol. 110.
Giang T. Pham et al., "Processing and Modeling of Conductive Thermoplastic/Carbon Nanotube Films for Strain Sensing", Composites Part B: Engineering, 2008, pp. 209-216, vol. 39.
Stephen C. Conlon et al., "Airframe Structural Damage Detection: A Non-Linear Structural Surface Intensity Based Technique", The Journal of Acoustical Society of America, Apr. 2011, pp. EL121-EL127, vol. 129, No. 4.
Rajesh Kumar Srivastava et al., "The Strain Sensing and Thermal-Mechanical Behavior of Flexible Multi-Walled Carbon Nanotube/Polystyrene Composite Films", Carbon, 2011, pp. 3928-3936, vol. 49, No. 12.
Qi Su et al., "Towards Free-Standing Graphene/Carbon Nanotube Composite Films via Acetylene-Assisted Thermolysis of Organocobalt Functionalized Graphene Sheets", Chem. Commun., 2010, pp. 8279-8281, vol. 46.
Yi Wang et al., "Super-Elastic Graphene Ripples for Flexible Strain Sensors", ACS Nano, 2011, pp. 3645-3650, vol. 5, No. 5.

* cited by examiner

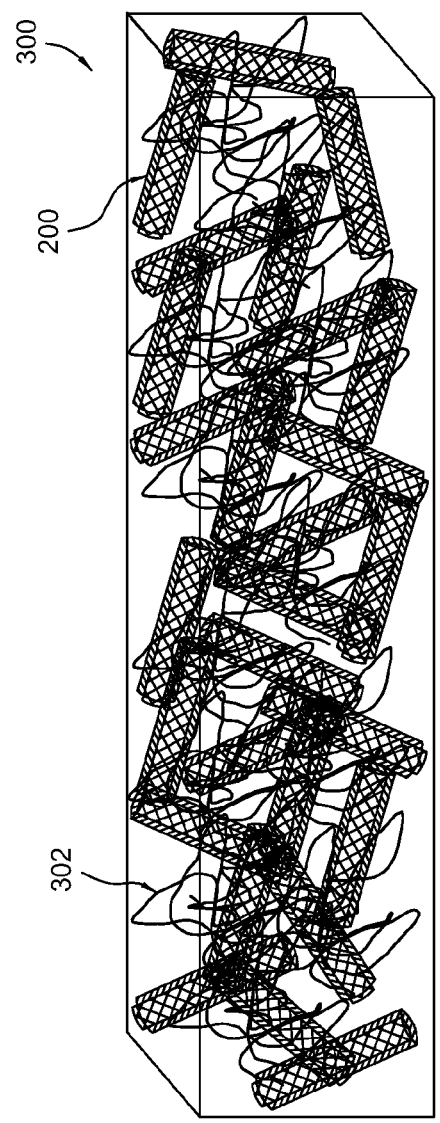
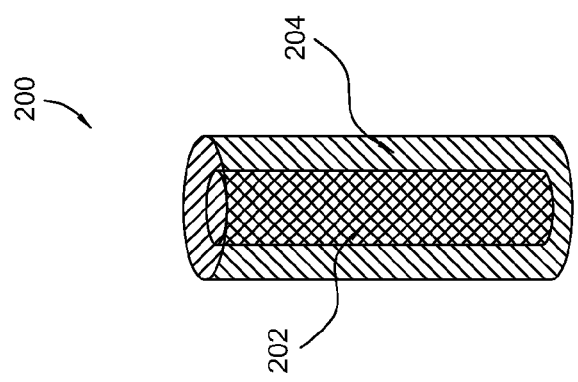
FIG. 3
FIG. 2

GRAPHENE FUNCTIONALIZED CARBON NANOTUBE POLYMER COMPOSITES AND METHODS FOR THEIR PREPARATION AND USE

CROSS REFERENCE TO RELATED APPLICATION

The present application is a U.S. National Stage filing under 35 U.S.C. § 371 of International Application No. PCT/IB2013/050144, filed on Jan. 8, 2013, and entitled "GRAPHENE FUNCTIONALIZED CARBON NANOTUBE POLYMER COMPOSITES AND METHODS FOR THEIR PREPARATION AND USE." The International Application claims priority to Indian Patent Application No. 2468/CHE/2012, filed on Jun. 21, 2012. The Indian Patent Application and the International Application, including any appendices or attachments thereof, are hereby incorporated by reference in their entireties.

BACKGROUND

Structural health monitoring (SHM) systems are widely used for monitoring structural safety, integrity and performance of a variety of structures such as buildings and aircraft components, among others. Typically, damages such as cracks or delaminations can arise in the material of structures due to high loads or through too high production tolerances. Such damages can considerably weaken the mechanical stiffness and the strength of the components and the overall structure. Especially in connection with an aircraft, the components of the aircraft are also subjected to the danger of impact damages through birds and ice particles during operation. In order to ensure the integrity of such structures, it is desirable to simultaneously monitor the strain, temperature and vibration frequency applied to them in real time.

Strain gauges are used to monitor strain for structures such as aircraft components. Typically, strain gauges are built into mechanical structures to allow continuous or periodic monitoring of defects in the structures. Alternatively, they are retrofitted to structures by being adhered thereto for testing purposes. Such strain gauges provide instantaneous data that is used for real-time monitoring of the structural health of the structures and provide an early warning of a possible unsafe condition.

Unfortunately, the conventional strain gauges used for measuring strain of such structures are usually formed of metals that are quite heavy and are corrosive in nature leading to reliability issues. Moreover, the chemical resistance of such gauges is substantially low along with a substantially low gauge factor resulting in inaccurate and unreliable strain data. In addition, the available strain gauges are anisotropic strain sensors that measure strain in only one direction.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, methods of forming graphene functionalized carbon nanotube polymer composites are provided. The methods can include functionalizing a plurality of carbon nanotubes using conducting functional molecules to form a composite nanofiller and embedding the composite nanofiller within a polymer material to form the graphene functionalized carbon nanotube polymer composite.

In accordance with another aspect, graphene functionalized carbon nanotube polymer composites are provided. The graphene functionalized carbon nanotube polymer composites can include a plurality of carbon nanotubes and at least one graphene layer disposed around the plurality of carbon nanotubes to form a composite nanofiller. The graphene functionalized carbon nanotube polymer composites can also include a polymer material embedding the composite nanofiller.

In accordance with another aspect, electromechanical strain sensors are provided. The electromechanical strain sensors can include a composite nanofiller having a plurality of carbon nanotubes coated by at least one graphene layer and a polyvinylidene fluoride (PVDF) matrix embedding the composite nanofiller.

BRIEF DESCRIPTION OF THE FIGURES

FIG. 2 illustrates an example graphene functionalized carbon nanotube composite nanofiller.

FIG. 3 illustrates an example graphene functionalized carbon nanotube polymer composite.

DETAILED DESCRIPTION

Figure 1:
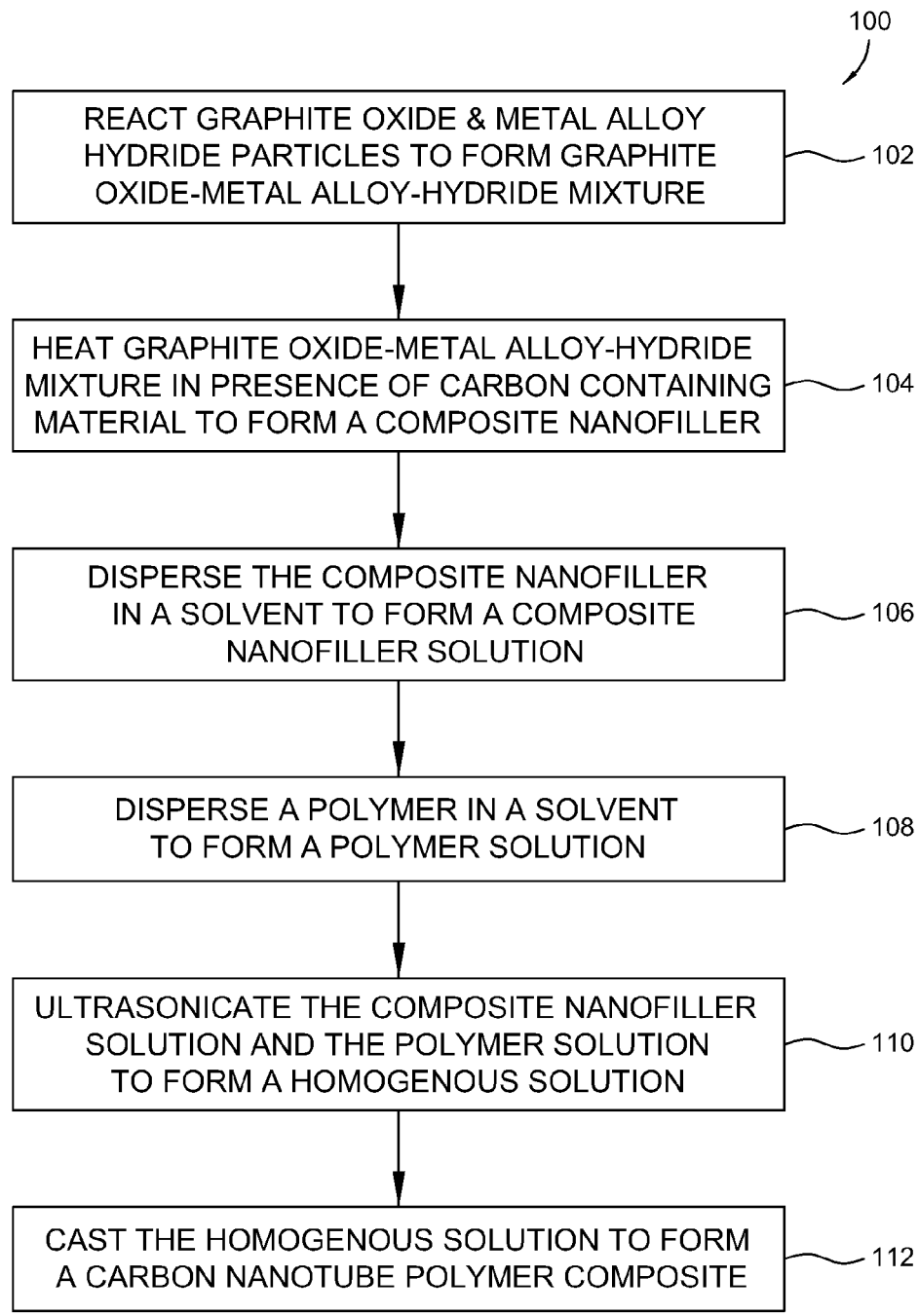
FIG. 1 is an example flow diagram of an embodiment of a method of forming a graphene functionalized carbon nanotube polymer composite.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

Example embodiments are generally directed to graphene functionalized carbon nanotubes polymer composites and use of such composites in sensing applications. The present technique provides a simple and cost-effective process for forming graphene wrapped carbon nanotubes based polymer composites that can be used for strain sensing applications such as structural health monitoring of a variety of structures. Electromechanical strain sensors incorporating such composites facilitate strain sensing in multiple directions and have substantially high strain gauge factor as compared to that of conventional strain sensors.

Referring now to FIG. 1, an example flow diagram 100 of an embodiment of a method of forming a graphene functionalized carbon nanotube polymer composite is illustrated. At block 102, graphite oxide and a plurality of metal hydride particles are reacted to form a graphite oxide-metal alloy hydride mixture. The graphite oxide and the metal hydride particles are mixed using grinding process. Examples of metal hydride particles include, but are not limited to, misch metal (Mm) hydride, nickel metal hydride, iron metal hydride, cobalt metal hydride, or combinations thereof. Examples of metal hydrides include $MmNi_3$, $DyNi_3$, $FeNi_3$, among others. In one example embodiment, the metal hydride particles include organometallic compounds such as ferrocene ($Fe(C_5H_5)_2$).

At block 104, the graphite oxide-metal alloy hydride mixture is heated in a chemical vapor deposition (CVD) chamber. The graphite oxide-metal alloy hydride mixture is heated in presence of a carbon-containing material in argon atmosphere to form a composite nanofiller. The carbon-containing material may include acetylene ($C_2H_2$), methane ($CH_4$), ethane ($C_2H_4$), butane ($C_4H_{10}$), propane ($C_3H_8$), or combinations thereof. In certain embodiments, a flow rate of the carbon containing material within the CVD chamber is about 40 standard cubic centimeters per minute (sccm) to about 60 sccm.

In this example embodiment, hydrogen gas ($H_2$) is introduced within the CVD chamber while heating the graphite oxide-metal alloy hydride mixture. In certain embodiments, a flow rate of hydrogen gas is about 40 sccm to about 70 sccm. The graphite oxide-metal alloy hydride mixture is heated in presence of an inert gas at a temperature suitable to form the composite nanofiller having carbon nanotubes coated with at least one graphene layer.

At block 106, the composite nanofiller is dispersed in a solvent to form a composite nanofiller solution. Moreover, at block 108, a polymer material is dispersed in the solvent to form a polymer solution. The polymer material includes a thermosetting polymer, or a thermoplastic polymer, or combinations thereof. Examples of the polymer material include, but are not limited to, polyvinylidene fluoride (PVDF), polystyrene, polyethylene terephthalate (PET), polyethylene oxide (PEO), polyvinylpyrrolidone (PVP), polyether ether ketone (PEEK), nylon 6, or combinations thereof. Examples of the solvent include dimethyl formamide (DMF), N-methyl-2-pyrrolidone (NMP), dimethyl sulfide (DMS), acetone, or water, or combinations thereof.

At block 110, the composite nanofiller solution and the polymer solution are mixed and ultrasonicated to form a homogenous solution. The composite nanofiller solution and the polymer solution may be ultrasonicated and high-shear mixed at a suitable speed to form the homogenous solution.

In certain example embodiments, the composite nanofiller solution and the polymer solution are ultrasonicated and shear mixed at a speed of about 1500 rpm to about 3000 rpm for about 50 minutes to about 100 minutes.

The homogenous solution is subsequently solvent casted using a solvent casting technique, as is known in the art to form a graphene functionalized carbon nanotube polymer composite (block 112). The graphene functionalized carbon nanotube polymer composite formed using the technique described above includes the composite nanofiller having at least one graphene layer disposed around the carbon nanotubes and the polymer material embedding the composite nanofiller.

FIG. 2 illustrates an example graphene functionalized carbon nanotube composite nanofiller 200. The graphene functionalized carbon nanotube composite 200 includes a plurality of carbon nanotubes generally represented by reference numeral 202 and at least one graphene layer 204 disposed around the plurality of carbon nanotubes 202 to form the graphene functionalized carbon nanotube composite nanofiller 200. In certain example embodiments, the composite nanofiller has about 2% to about 3% graphene by weight.

As described with reference to FIG. 1, the at least one graphene layer 204 may be formed by reacting graphite oxide and a plurality of metal alloy hydride particles and heating the resultant graphite oxide-metal alloy hydride mixture in a CVD chamber to form the graphene layer 204. Examples of metal hydride particles include, but are not limited to, nickel metal hydride, iron metal hydride, cobalt metal hydride, or combinations thereof. In one example embodiment, a size of the metal hydride particles is about 1 microns to about 10 microns. In certain embodiments, the plurality of carbon nanotubes 202 include single walled carbon nanotubes, multi walled carbon nanotubes, or combinations thereof. Moreover, the diameter of the composite nanofiller is about 60 nanometers to about 70 nanometers.

FIG. 3 illustrates an example graphene functionalized carbon nanotube polymer composite 300. The graphene functionalized carbon nanotube polymer composite 300 includes a polymer material 302 embedding the graphene functionalized carbon nanotube composite nanofiller 200. In this example embodiment, the polymer material 302 includes a thermosetting polymer, or a thermoplastic polymer, or combinations thereof.

Examples of the polymer material include, but are not limited to, polyvinylidene fluoride (PVDF), polystyrene, polyethylene terephthalate (PET), polyethylene oxide (PEO), polyvinylpyrrolidone (PVP), polyether ether ketone (PEEK), nylon 6, or combinations thereof. Moreover, the solvent includes dimethyl formamide (DMF), N-methyl-2-pyrrolidone (NMP), dimethyl sulfide (DMS), acetone, or water, or combinations thereof.

As described above, the graphene functionalized carbon nanotube composite nanofiller 200 is embedded within the polymer material 302 by forming a polymer solution that is mixed with composite nanofiller solution and casting the resultant homogenous solution.

The graphene functionalized carbon nanotube polymer composite 300 formed using the present technique may be configured for use as a sensor, an actuator (e.g., piezoelectric actuators and piezoresistive actuators), or combinations thereof. The present technique of forming conducting polymer nanocomposites may be used for radiation protection applications. The graphene functionalized carbon nanotube polymer composite can be used in a variety of chemical and biological sensing instruments. The sensors using the composites describe above have capabilities to measure displacement and/or strain in more than one direction and have strain gauge factors that are substantially higher than that of conventional strain gauges based on carbon nanotube polymer composites and graphene polymer composites.

Moreover, such composites can be used in transparent conductors and electrode materials for rechargeable lithium ion secondary batteries. As will be appreciated by those skilled in the art the enhanced electrical properties owing to the combination of graphene and carbon nanotubes in such composites make them suitable for electrode materials for fuel cells and solar cells.

In addition, the graphene functionalized carbon nanotube polymer composite formed using the present technique has substantially high chemical resistance. In certain example embodiments, the chemical resistance of such composites when subjected to an acid medium is about 98%. Particularly, after treating the composite with strong acids, about 98% of the weight of composite remains stable. It should be noted that the present technique facilitates ease of synthesis of such composites along with large scale production capability thereby making them suitable for a variety of applications.

EXAMPLES

The present invention will be described below in further detail with examples and comparative examples thereof, but it is noted that the present invention is by no means intended to be limited to these examples.

Example 1

Synthesis of a Graphene Functionalized Carbon Nanotube PVDF Composite

A graphene functionalized carbon nanotube PVDF composite was formed using the process described with reference to FIG. 1. Here carbon nanotubes were functionalized using conducting graphene molecules. In particular, graphite oxide and metal alloy hydride particles were reacted using grinding process and the resultant graphite oxide-metal alloy hydride mixture was heated in a CVD chamber at a temperature of about 500° C. Subsequently, hydrogen gas was introduced into the CVD chamber for about 30 minutes at a flow rate of about 50 sccm.

The graphite oxide-metal alloy hydride mixture was further heated in the presence of argon gas at a temperature of about 700° C. Moreover, acetylene gas was introduced within the CVD chamber for about 30 minutes with a flow rate of about 50 sccm while the temperature within the CVD chamber was maintained at about 700° C. The resultant composite nanofiller with graphene layer disposed around carbon nanotubes was collected and purified.

The composite nanofiller was then dispersed in dimethyl formamide (DMF) solvent and a homogenous composite nanofiller solution was prepared. Moreover, PVDF was also dissolved in the DMF solvent to prepare a PVDF solution. Subsequently, the composite nanofiller solution and the PVDF solution were mixed and stirred at a speed of about 3000 rpm for about 60 minutes and the resultant homogenous composite solution was solvent casted at a temperature of about 70° C. to form the graphene functionalized carbon nanotube PVDF composite.

Example 2

Characterization of the Graphene Functionalized Carbon Nanotube PVDF Composite of Example 1

Figure 5:
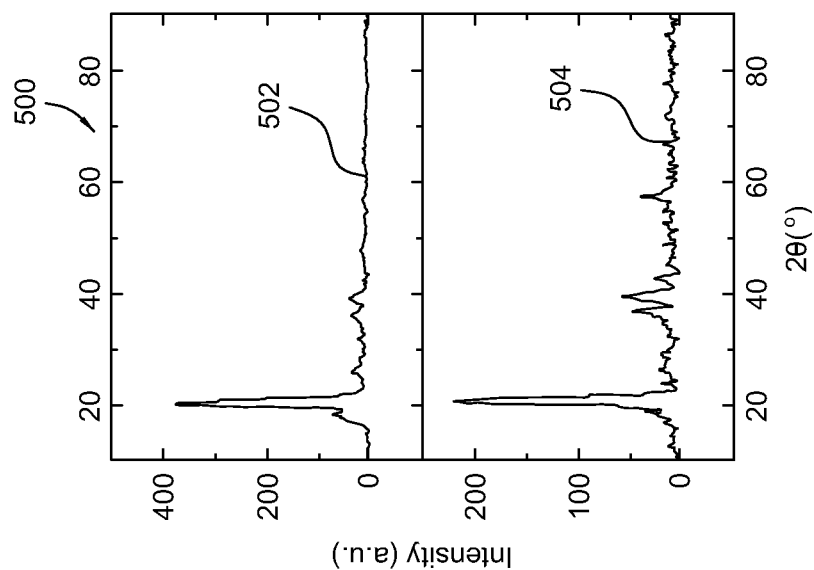
FIG. 5 illustrates X-ray diffractograms of a graphene functionalized carbon nanotube PVDF composite and a pure PVDF composite.
Figure 4:
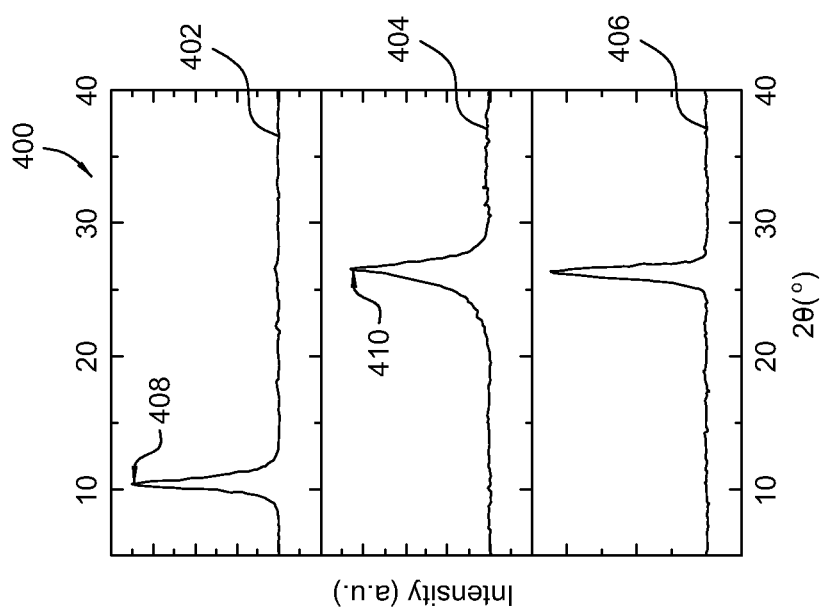
FIG. 4 illustrates X-ray diffractograms of graphite oxide (GO), graphene carbon nanotubes composite and carbon nanotubes.

FIG. 4 illustrates X-ray diffractograms 400 of graphite oxide (GO), graphene carbon nanotubes composite and for carbon nanotubes represented generally by reference numerals 402, 404 and 406 respectively. Moreover, FIG. 5 illustrates X-ray diffractograms 500 of graphene functionalized carbon nanotube PVDF composite and pure PVDF composite that are represented generally by reference numerals 502 and 504 respectively. Here the interlayer distance in the GO expanded from about 3.4 Å for graphite to about 8.4 Å (corresponding to peak 408 at 10.6 ||) due to the presence of functional groups.

The XRD pattern of the purified graphene carbon nanotubes composite 404 exhibited an intense peak 410 at about 26.49° corresponding to C (002) plane with an interlayer (d) spacing of about 0.34 nanometers (nm). This peak was observed common to both carbon nanotubes and graphene. Moreover, as illustrated from XRD 402 of the graphene functionalized carbon nanotube PVDF composite, the absence of a peak at 10.6° validated complete reduction of GO. Further, the crystallite size for graphene carbon nanotubes composite estimated using Scherrer formula was about 5.1 nm. It should be noted that the crystalline nature of PVDF in nanocomposite is seen after the PVDF is dispersed in the graphene carbon nanotubes composite nanofiller. Moreover, the peaks observed in the XRD 502 and 504 for the graphene functionalized carbon nanotube PVDF composite and pure PVD composite corresponded to alpha and beta polymorphs of the polymer.

Example 3

Surface Morphology Pattern of the Graphene Carbon Nanotubes Composite Nanofiller of Example 1

Figure 6:
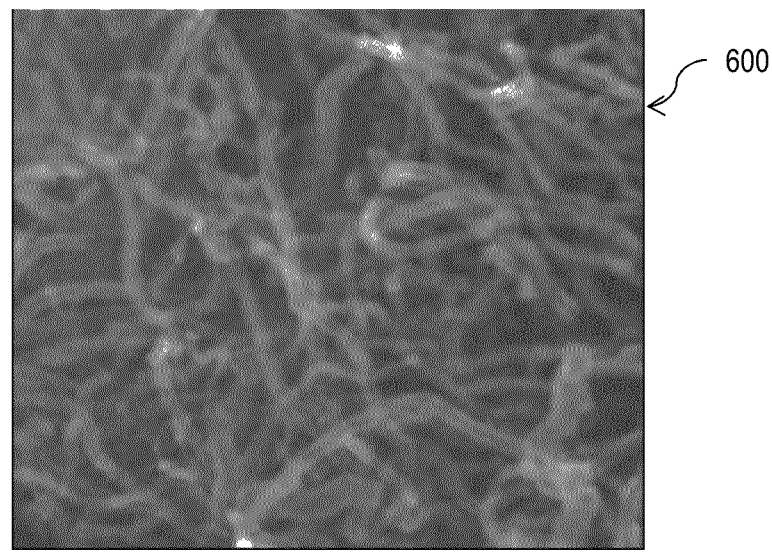
FIG. 6 is a low resolution field emission scanning electron microscope (FESEM) image of the graphene carbon nanotubes composite nanofiller of FIG. 2.
Figure 7:
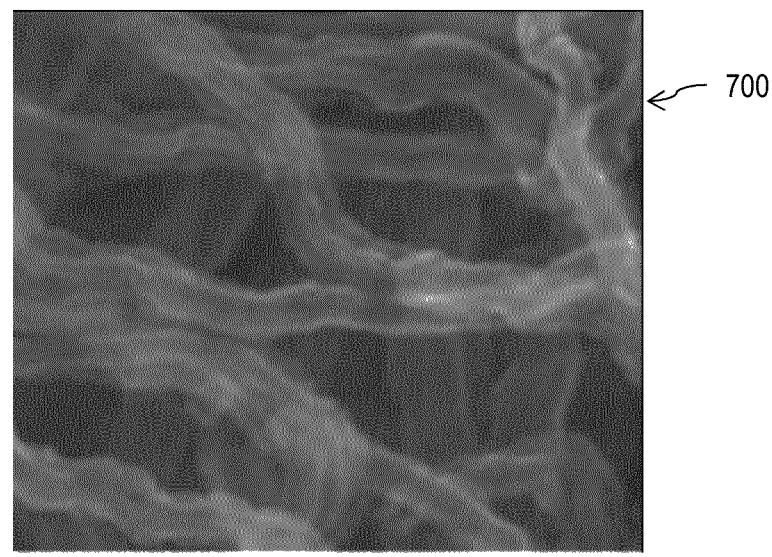
FIG. 7 is a high resolution FESEM image of the graphene carbon nanotubes composite nanofiller of FIG. 2.

FIGS. 6 and 7 are low and high resolution field emission scanning electron microscope (FESEM) images 600 and 700 of the graphene carbon nanotubes composite nanofiller. As can be seen from images 600 and 700, the graphene layers were coated throughout the length of the carbon nanotubes. Here, a smooth coating of graphene of about 20 nm over CNT was observed. Moreover, the total diameter of the composite nanofiller was estimated to be about 65 nm to about 70 nm.

Example 4

Composition Analysis of the Graphene Carbon Nanotubes Composite Nanofiller of Example 1

The composition of the graphene carbon nanotubes composite nanofiller obtained from energy-dispersive X-ray spectroscopy (EDX) spectra was estimated to be about 94 wt. % to about 95 wt. % of carbon and about 5% to about 6% of oxygen, whereas the oxygen content in the case of GO was estimated to be about 33 wt. %. The composition analysis thus implied that the purified composite samples were devoid of any metal catalysts and the presence of oxygen made the samples hydrophilic which in turn facilitated efficient dispersion in polar solvents.

Example 5

Configuration of a Strain Sensor Using the Graphene Functionalized Carbon Nanotube PVDF Composite A nanocomposite film having about 3 wt. % graphene functionalized carbon nanotube PVDF composite was attached to one side of an aluminium (Al) specimen (dimensions: 28 cm×5 cm×0.3 cm) using epoxy. Moreover, on the other side of the specimen, a conventional metallic strain gauge was attached using glue. A constant step load was applied along an axial direction of the composite and corresponding resistance was measured for different values of strain. The Al specimen was subjected to ramping loads, tensile and compressive loads on materials testing system MTS 810 (commercially available from MTS Systems Corporation) using servo hydraulic test machine. The corresponding strain in the composite was measured with a conventional metallic strain gauge.

The sensitivity of the strain gauge was estimated using a gauge factor. As used herein, the term "gauge factor" is defined as the relative change in resistance to the mechanical strain and can be represented below by Equation 1:

$$GaugeFactor = \frac{\Delta R}{R_o \varepsilon} \qquad (1)$$

Where: $\Delta R$ represents change in resistance under mechanical strain $R_o$ represents the resistance of the composite without application of strain $\varepsilon$ represents the mechanical strain.

Example 6

Figure 9:
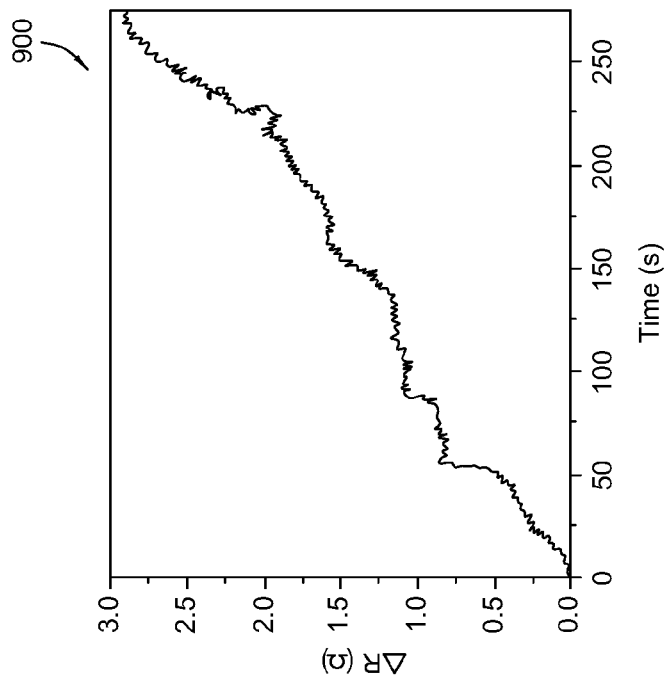
FIG. 9 is a graphical representation of a change in resistance measured under applied mechanical strain for the graphene functionalized carbon nanotube PVDF composite of FIG. 3.
Figure 8:
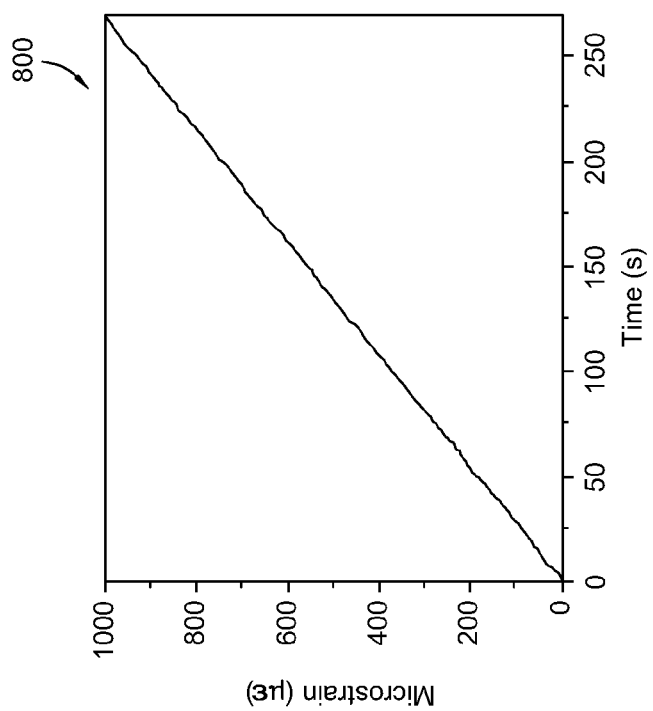
FIG. 8 is a graphical representation of microstrain measured for the graphene functionalized carbon nanotube PVDF composite of FIG. 3.

Results of Electromechanical Tests Performed on the Graphene Functionalized Carbon Nanotube PVDF Composite FIG. 8 is a graphical representation 800 of microstrain ($\mu\varepsilon$) measured for the graphene functionalized carbon nanotube PVDF composite. Moreover, FIG. 9 is a graphical representation 900 of the change in resistance ($\Omega$) under applied mechanical strain. The initial resistance of the graphene wrapped carbon nanotubes was about 150$\Omega$ with no applied strain. Moreover, a change in resistance of about 3$\Omega$ was observed corresponding to about 1000$\mu\varepsilon$ of strain. Here, the gauge factor was estimated to be about 20. In case of conventional strain gauges, a resistance change of about 0.12$\Omega$ was measured corresponding to about 1000$\mu\varepsilon$ of strain.

Example 7

Comparative Results for Gauge Factor for the Graphene Functionalized Carbon Nanotube PVDF Composite Described Above and Other Conventional Strain Gauge Materials Table 1 shows strain gauge factors for the graphene functionalized carbon nanotube PVDF composite of Example 1 and other conventional materials.

TABLE 1

| No. | MATERIAL | MAXIMUM GAUGE FACTOR |
|---|---|---|
| 1 | Graphene functionalized carbon nanotube PVDF composite Multi-walled Carbon Nanotubes- | 20 |
| 2 | Poly(methyl methacrylate)-Multiwalled Carbon Nanotubes (PMMA/MWNT) Composite | 15.3 |
| 3 | Graphene epoxy | 11.4 |
| 4 | Graphene film | 6.1 |
| 5 | Functionalized Graphene PVDF composite | 3.4 |
| 6 | Polystyerene (MWCNT/PS) film | 3.2 |
| 7 | Graphene | 1.9 |
| 8 | Graphene ripples | −2 |

As can be seen, the strain gauge factor for the graphene functionalized carbon nanotube PVDF composite formed using the present technique is about 20 that is substantially higher than the strain gauge factor of conventional strain gauges based on carbon nanotube polymer composites and graphene polymer composites. Moreover, the graphene functionalized carbon nanotube PVDF composite based sensor is configured to be an isotropic sensor that can measure strain in more than one direction, which is not achievable by most of the conventional strain gauges.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A graphene functionalized carbon nanotube polymer composite comprising:
at least one graphene layer disposed around a plurality of carbon nanotubes to form a composite nanofiller of graphene functionalized carbon nanotube, wherein the composite nanofiller comprises about 94% to about 95% of carbon and about 5% to about 6% of oxygen; and
a polymer material embedding the composite nanofiller, wherein the graphene functionalized carbon nanotube polymer composite has a strain gauge factor of about 20.

2. The graphene functionalized carbon nanotube polymer composite of claim 1, wherein the composite nanofiller of graphene functionalized carbon nanotube is formed h heating graphite oxide-metal alloy-hydride mixture in the presence of a carbon containing material, and the graphite oxide-metal alloy-hydride mixture is a product of graphite oxide and a plurality of metal alloy particles, and the plurality of metal alloy particles comprise nickel metal hydride, iron metal hydride, cobalt metal hydride, or organometallic compounds, or combinations thereof.

3. The graphene functionalized carbon nanotube polymer composite of claim 2, wherein the carbon, containing material, comprises acetylene ($C_2H_2$), methane ($CH_4$), ethane ($C_2H_4$), butane ($C_4H_{10}$), propane ($C_3H_8$), or combinations thereof.

4. The graphene functionalized carbon nanotube polymer composite of claim 1, wherein the plurality of carbon nanotubes comprise single walled carbon nanotubes, multi walled carbon nanotubes, or combinations thereof.

5. The graphene functionalized carbon nanotube polymer composite of claim 1, wherein the polymer material comprises a thermosetting polymer, a thermoplastic polymer, or combinations thereof.

6. The graphene functionalized carbon nanotube polymer composite of claim 5, wherein the polymer material comprises polyvinylidene fluoride (PVDF), polystyrene, polyethylene terephthalate (PET), polyethylene oxide (PEO), polyvinylpyrrolidone (PVP), polyether ether ketone (PEEK), nylon 6, or combinations thereof.

7. The graphene functionalized carbon nanotube polymer composite of claim 1, wherein a diameter of each of the plurality of graphene functionalized carbon nanotubes is about 60 nm to about 70 nm.

8. The graphene functionalized carbon nanotube polymer composite of claim 1, wherein the composite nanofiller forms a sensor, an actuator, or combinations thereof.

9. The graphene functionalized carbon nanotube polymer composite of claim 1, wherein the graphene layer comprises, a thickness of about 20 nm around any of the plurality if carbon nanotubes.

* * * * *